US005314041A

United States Patent [19]

Jerrow et al.

[11] Patent Number: 5,314,041

[45] Date of Patent: May 24, 1994

[54] SAWHORSE

[76] Inventors: Jeffrey Jerrow, 645 Old Four Bridges Rd.; William R. Jerrow, 645 Four Bridges Rd., both of Chester, N.J. 07930

[21] Appl. No.: 908,974

[22] Filed: Jul. 6, 1992

[51] Int. Cl.⁵ .............................................. F16M 11/00

[52] U.S. Cl. .................................... 182/181; 182/151; 182/224

[58] Field of Search ................ 182/151, 153, 181-186, 182/224-227

[56] References Cited

U.S. PATENT DOCUMENTS

| | | | |
|---|---|---|---|
| 302,945 | 8/1884 | Sargent | 182/181 |
| 1,147,668 | 7/1915 | Anderson | 182/185 |
| 1,377,425 | 5/1921 | Milnes | 182/153 |
| 2,812,219 | 11/1957 | Lange | 182/185 |
| 3,788,581 | 1/1974 | Rutzick | 248/678 |
| 4,565,263 | 1/1986 | Southworth | 182/185 X |

FOREIGN PATENT DOCUMENTS

| | | | |
|---|---|---|---|
| 1034508 | 7/1953 | France | 182/185 |

*Primary Examiner*—Alvin C. Chin-Shue
*Attorney, Agent, or Firm*—Kenneth R. Schaefer

[57] ABSTRACT

A sawhorse apparatus which is sturdy and easily assembled or disassembled facilitating efficient storage and mobility. The invention is more sturdy than prior devices because it incorporates "cross beam support channel(s)" that extend down most or all of its length, providing rigidity in all directions. The invention employs two alternative embodiments. "Type A" features a single three sided channel that cradles the bottom of the cross beam and interfaces with a plurality support leg device using tapered dovetail or "T" rail groove joints. "Type B" features separate channel members, one attached to each end of the cross beam member and the combination extending along all or most of the cross beam length. The channel members are integrally molded to end pieces that provide sockets into which lumber support legs are inserted.

15 Claims, 5 Drawing Sheets

FIGURE I

SAWHORSE

TECHNICAL FIELD

This invention relates to a sawhorse and more particularly to a collapsible sawhorse which allows for easy assembly and disassembly.

BACKGROUND OF THE INVENTION

The present invention relates to carpenter saw horses which are generally used to support construction material, such as boards, sheet rock, etc., while a worker cuts or otherwise alters the material and more specifically relates to saw horses of the type that can accommodate of a cross beam supported at each end by support legs that are removable for easy storage or transport. Saw horses of this type generally use connections interfacing the cross beam with the support legs which are relatively loose and allow considerable movement making such collapsible sawhorses unsafe. Much of this movement is due to the fact that the legs are attached to the cross member with brackets that only interface with a short length of the beam, thus allowing pivoting of the legs relative to the cross beam.

The present invention overcomes the problems associated with these prior devices by utilizing either a unitary molded design or improved linkage techniques that eliminate pivotal movement of the support legs relative to the cross beam. Additionally, the present invention utilizes a channel or channels that interface along most of the cross beam length instead of interfacing solely with the brackets.

DESCRIPTION OF THE PRIOR ART

Various sawhorses have been developed which can be assembled and disassembled. Conventional collapsible sawhorses usually employ brackets and/or screws which allow for manual assembly and disassembly. Moreover, the parts of these devices only interface with a short length of the cross found in U.S. Pat. Nos. 1,093,023 (Dovetail Mortise), 2,736,614 (Trestle), 2,812,219 (Knockdown Sawhorse), 3,848,701 (Bracketed Sawhorse) and 4,071,113 (Support Structure).

These prior art devices suffer from a number of disadvantages. The primary disadvantage being that interface devices used to join the sawhorse parts are generally relatively loose and allow for considerable movement of the parts making the sawhorses unsafe.

In particular, U.S. Pat. No. 1,093,023 describes a dovetail mortise and tenon joint whereby the tenon is inserted into the mortise and a wedge is subsequently inserted to keep the joint in place. This arrangement differs from the present invention because the present invention uses tapered dovetails or "T" rails and matching grooves so that the matching pieces can be assembled by sliding the dovetail into the matching groove, whereas the prior arrangement contemplates a socket and plug type assembly.

U.S. Pat. No. 2,736,614 describes a trestle assembly whereby a cross beam sits in a relatively short channel. Additionally, this arrangement uses brackets which provide a relatively loose connection between the cross beam and the support legs. The molded design of the present invention is superior because it eliminates pivotal movement inherent in sheet fabricated brackets of the prior type.

U.S. Pat. No. 2,812,219 describes a knockdown saw horse featuring two metallic brackets which are connected by a tapered dovetail and matching groove. This arrangement also features support leg sockets into which the support legs are inserted. The prior arrangement is inferior for four reasons. First, the bracket is attached to the cross beam by four screws which can easily loosen because of an increased bearing force created by the short distance between screws. Second, the support leg sockets are relatively short, consequently allowing excessive movement. Third, the tapered dovetail connection is much shorter than that of the present invention. And fourth, although the present invention uses a tapered dovetail joint, the connection is tighter by design. Whereas the dovetail and groove of the prior arrangement lies horizontally, relying on friction and the taper to keep the joint secured, the dovetail or "T" rail and groove of the present invention lie at an angle slightly away from the vertical. The top of the support leg device, where the end of the groove is located, is angled creating a wedge that fits securely into the complimentary angle formed by the bottom of the channel member and the end of the interface member where the dovetail or "T" rail is located. The combination of the cross beam and channel member weight, the wedge configuration, and the tapered dovetail or "T" rail provide a novel and superior connection.

U.S. Pat. No. 3,848,701 describes a sawhorse whereby, like U.S. Pat. No. 1,093,023, the cross beam sits in a relatively short channel, a disadvantage which the present invention overcomes by providing a longer channel which decreases bearing stress against the points of contact. Additionally, the prior arrangement uses brackets which provide a relatively loose connection between the cross beam and the support legs. The present invention is novel and superior because the interface(s) are unitary members which eliminate pivotal movement inherent in saw horses of the prior arrangement type.

U.S. Pat. No. 4,071,113 describes a support structure similar to a saw horse, but is distinguished from the present invention because it does not involve the use of a lumber cross member which may be supplied by the purchaser. Additionally the prior arrangement uses a wedge shaped connection between the prefabricated cross beam and the support legs which is substantially different than that of the present invention.

SUMMARY OF INVENTION

The present invention relates to a sawhorse which is sturdy and is easily assembled or disassembled facilitating efficient storage and mobility comprising at least one cross beam/support leg interface and a plurality of support leg devices wherein the bottom of a cross beam may be cradled by a channel incorporated within said cross beam/support leg interface and wherein the support legs interlock with the cross beam/support leg interface by means of a plurality of joints. The present invention is an advantage over prior inventions of this type because said cross beam/support leg interface contains a channel that extends longitudinally along the interface and allows all or most of the cross beam to be enveloped longitudinally by the channel on three of its sides, thereby providing an improved degree of rotational stability in three dimensions to the support legs relative to the cross beam length. Additionally, the disassembled parts are capable of being stored in a flat compact space allowing for said parts to be stored, for example, on a wall hook. The present invention employs two alternative embodiments.

In accordance with one aspect of this invention, a sawhorse apparatus features a cross beam/support leg interface containing one unitary three sided channel that cradles the bottom of a cross beam along its entire length. The cross beam/support leg interface member is integrally molded at the bottom of the channel member where it attaches to at least two support leg devices by means of at least two joints such as a tapered dovetail or "T" rail groove joint.

In accordance with a second presentation of this invention, the present invention features at least two molded, unitary cross beam/support leg interfaces having a channel which envelopes a cross beam and extending along all or most of the cross beam length enveloping the cross beam in three horizontal sides, each cross beam/support leg interface either meeting or coming close to each other at the center of the cross beam. The channels are integrally molded to end pieces that provide sockets into which support legs may be inserted.

Dimensions shown in any of the above figures are for the purpose of example only and should not be construed to limit the scope of the invention.

DETAILED DESCRIPTION OF THE PREFERRED EMBODIMENTS

Figure 1:
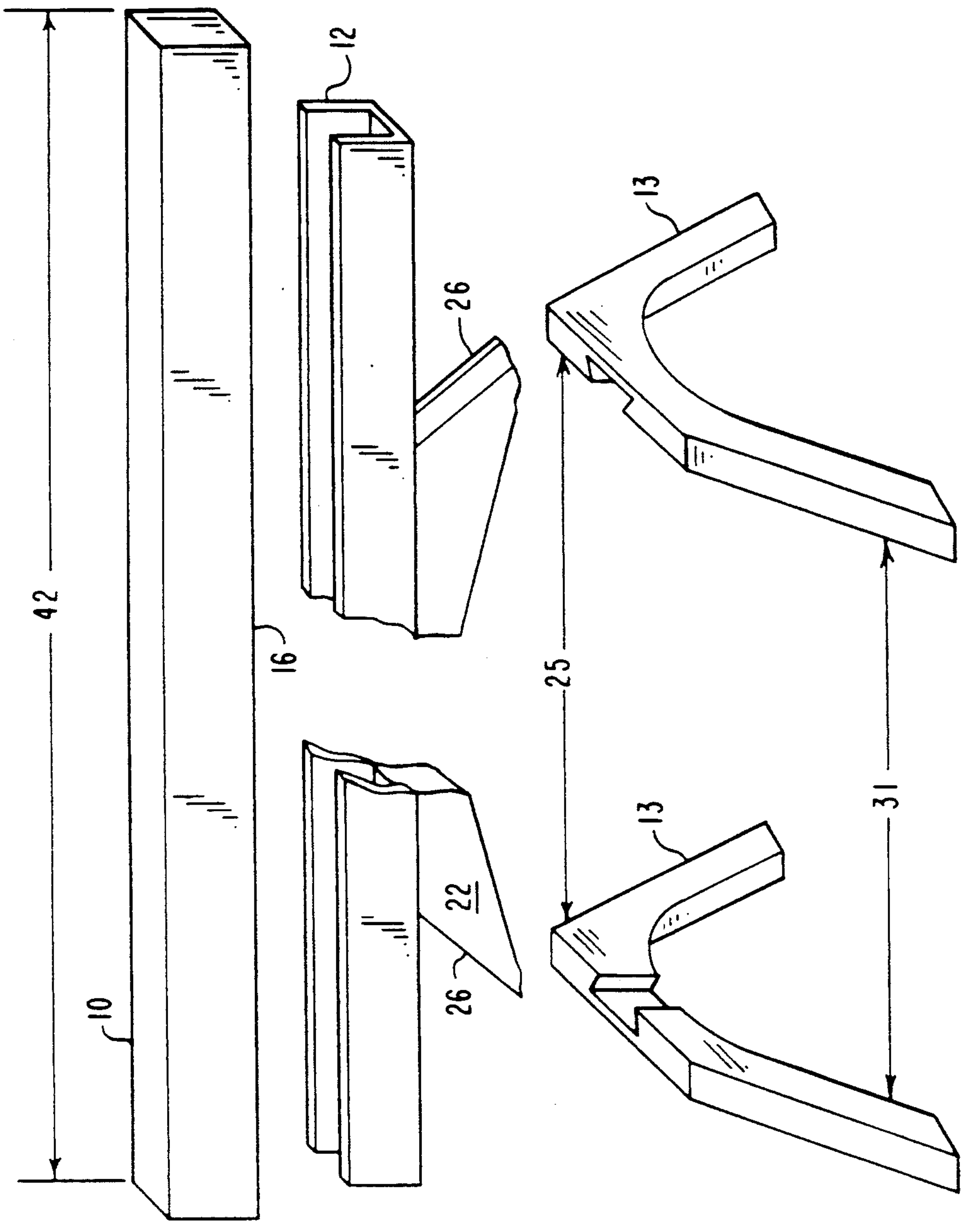
FIG. 1 illustrates an isometric view of a first preferred embodiment referred to as "Type A" showing leg support devices in a disassembled position and a support beam cross channel.
Figure 4:
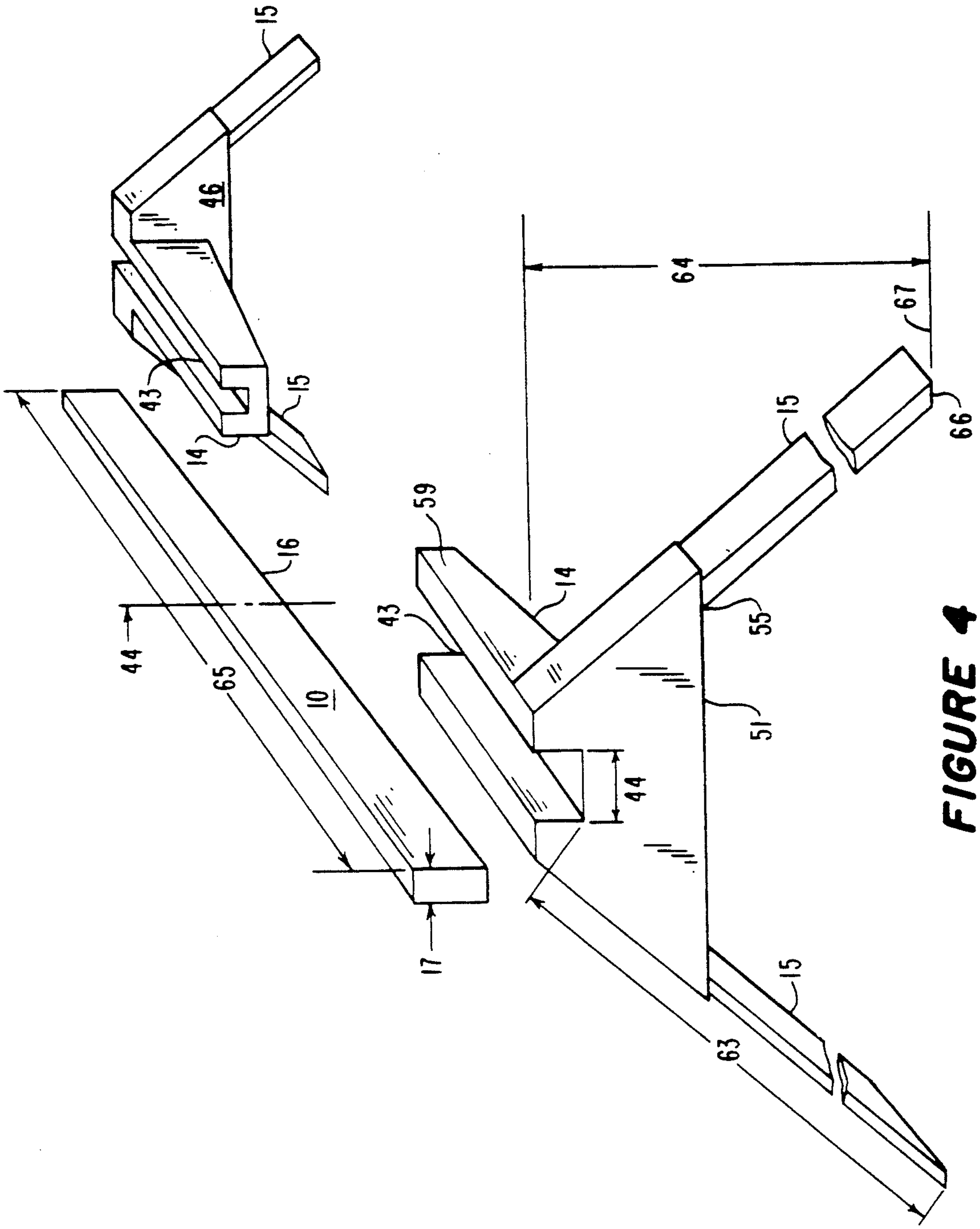
FIG. 4 illustrates an isometric view of a second version of the preferred embodiment referred to as "Type B" showing the present invention in a disassembled position.

Referring initially to FIGS. 1 and 4, a sawhorse apparatus is illustrated which is sturdy and is easily assembled or disassembled facilitating efficient storage and mobility. This invention is embodied in two alternative designs. The first, "Type A", comprises a single cross beam/support leg device interface 12, which may be used to cradle a cross beam 10. Said cross beam/support leg device supported by at least two leg support devices 13. The second, Type "B", illustrated in FIGS. 4 and 5, comprises at least two separate cross beam/support leg device interfaces 14 which may be used to cradle a cross beam 10. Said cross beam/support leg devices may be connected to at least two support leg devices and a plurality of support legs 66. The cross beam/support leg interface of both types A and B extend longitudinally along all or most of the cross beam bottom length 16 which, along with the molded unitary design of either type of channel support, 12 or 14, provide a high degree of rotational stability in three dimensions to the support leg devices, 13 or 15, relative to the cross beam/support leg device interface 12 or 14.

"TYPE A" DESCRIPTION

Figure 2:
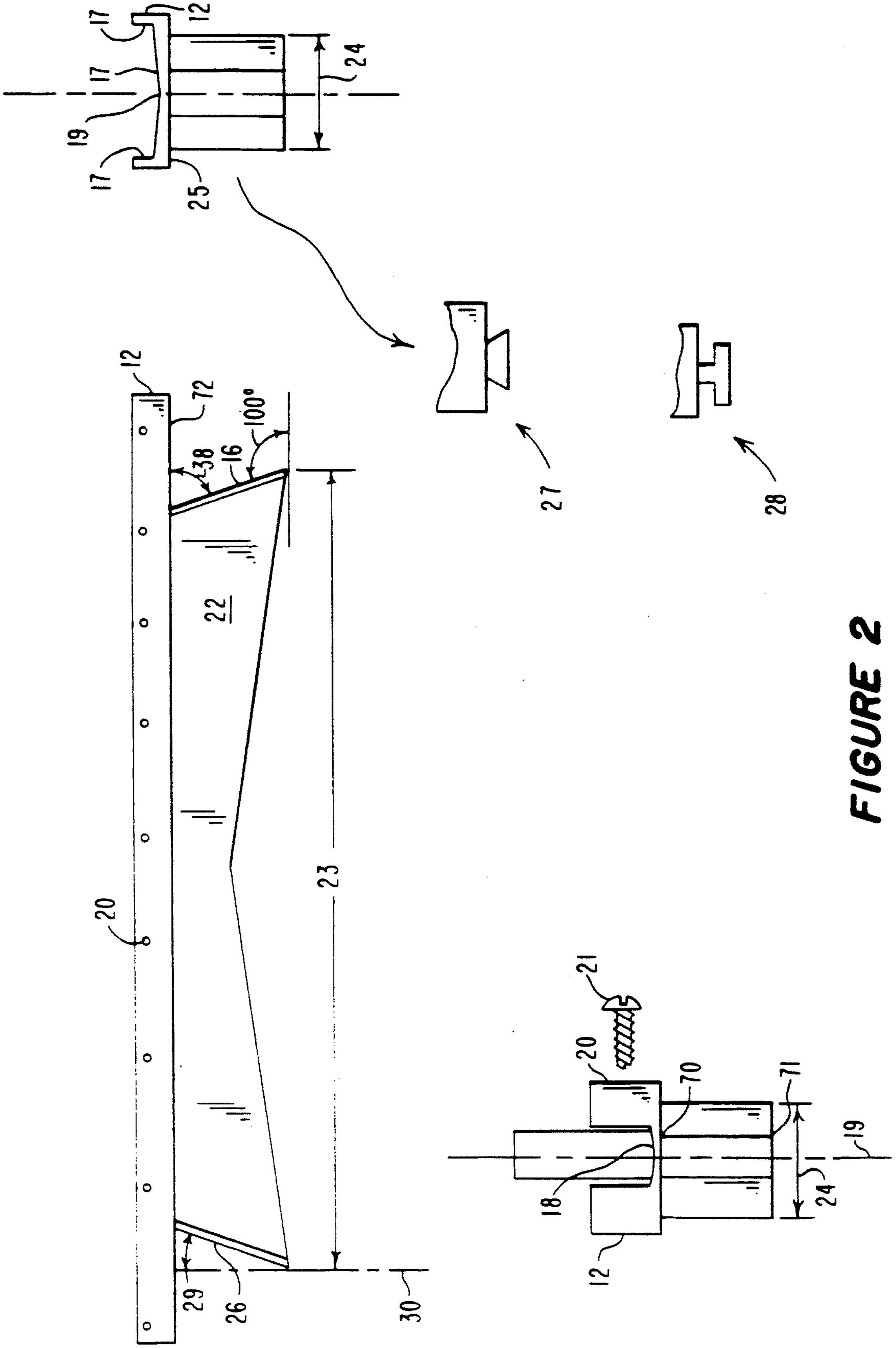
FIG. 2 illustrates front and side views of the cross beam/support leg interface of said preferred embodiment having a channel which runs horizontally along the interface and also having joints on the bottom of the interface for connection to support leg devices. This figure shows two alternative channel designs, one allowing for acceptance of the wider side of a lumber cross beam, and the other adapted to accept the narrower side of the lumber cross beam. This figure also shows two alternative types of connections between the interface member and the support leg devices, one being a tapered "dovetail", and the other being a tapered ""T" rail".

Referring now to FIGS. 1 and 2, the "Type A" embodiment comprises a single three sided channel 12 which envelopes the horizontal bottom surface 16 of an optional cross beam 10 and the lower portion of each of its sides. Said channel length extends down the entire length of the cross beam 10 and has a dimension, 17 or 18, adequate to accept and envelope exclusively a nominally 2×4 stud. Under one option, the bottom of the three sided channel 18 is dimensioned to accept the narrower side of a standard lumber cross beam 10, such as, but not exclusively the narrower side of a 2×4 stud. Under another option, the bottom of the three sided channel 17 is dimensioned to accept the wider side of a standard lumber cross beam 10, such as, but not exclusively the wider side of a 2×4 stud.

The bottom portion, 17 or 18, of the channel upon which the cross beam 10 rests is sloped towards the longitudinal center line 19 of the channel to provide a space between the cross beam 10 and the channel bottom, 17 or 18. This sloped bottom, 17 or 18, provides a means for moisture drainage.

Each side of the channel is provided with spaced holes 20 to provide a means for attachment to the cross beam 10. For example the cross beam may be secured by nailing or screwing 21 the cross beam to the cross beam/support leg interface through the channel side holes 20 into the cross beam 10. The holes are placed so that insertion of a nail or screw on either side of the cross beam will not collide.

An interface member, comprised of one molded unit 22 is located on the underside of the cross beam/support leg interface 12. Said interface member runs along the bottom longitudinal centerline 19 and along most of its length 23. The interface member 12 has a thickness 24 which is less than that of the cross beam/support leg interface bottom 25. Its length 23 is less than that of the cross beam/support leg interface 12 and determines the distance 25 between the leg support devices 13. The outer edges 26 of the interface member 22 are provided with either tapered dovetails 27 or tapered "T" rails 28 to secure the support leg devices 13 to the cross beam/-support leg interface 12 via its integrally molded interface member 22. The taper increases in width from the bottom 70 to the top 71.

The cross beam/support leg interface 22 outer dovetail 27 or "T" rail 28 edges 26 are slanted at angles 29, such as, but not exclusively, ten degrees from the vertical 30, providing a means for increasing the base of the apparatus by slanting the support leg devices 13 slightly away from center at its bottom 31, thereby adding stability to the entire apparatus.

Figure 3:
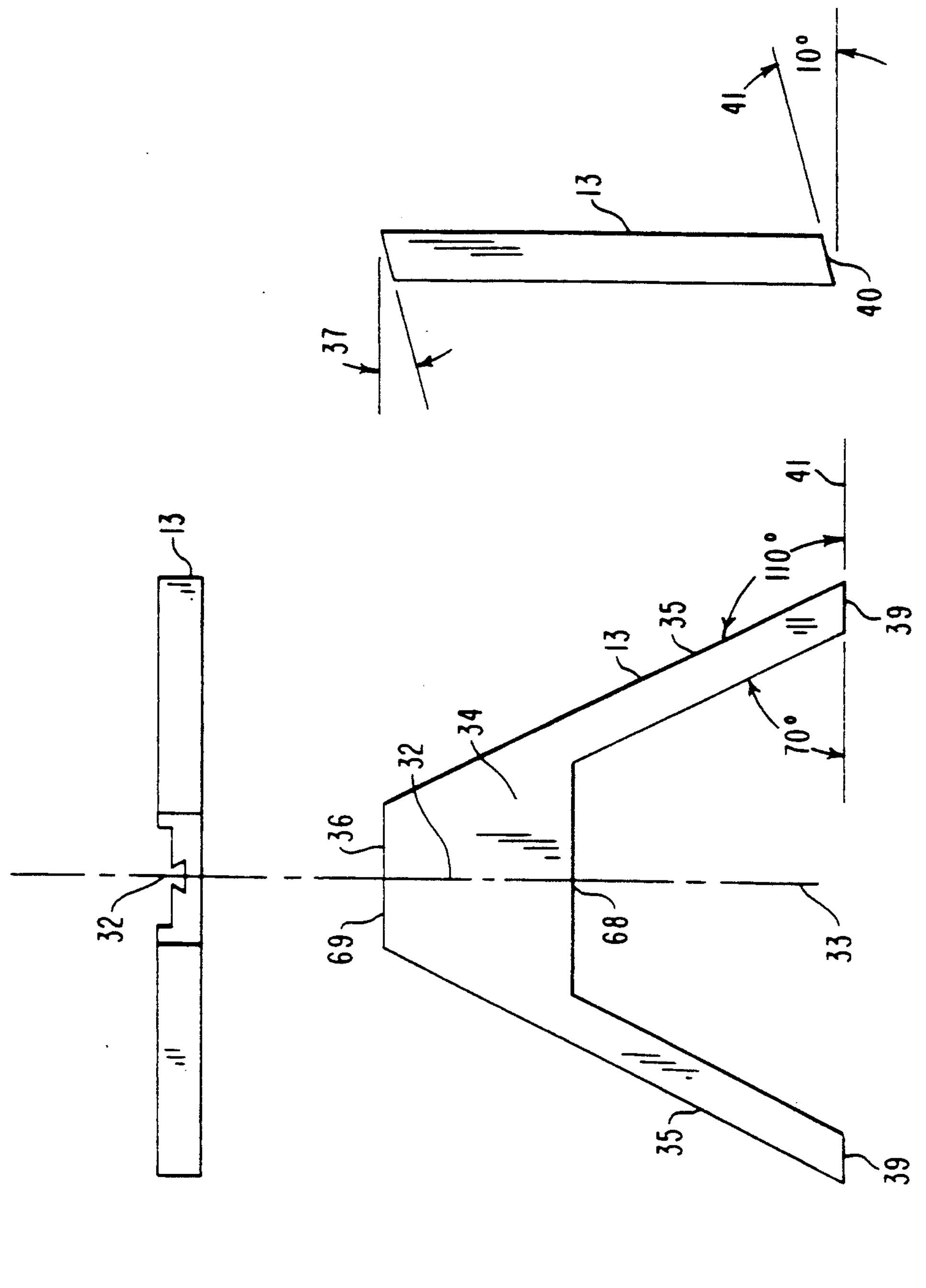
FIG. 3 illustrates front, side and top views of a leg support devices used in Type "A" of the preferred embodiment. This figure shows leg support devices containing the tapered "dovetail" groove option.

Referring now to FIGS. 2 and 3, the Type A embodiment uses at least two support leg devices 13. Each support leg device 13 is provided with a tapered dovetail 27 or tapered "T" rail 28 groove 32 that interlocks with either the dovetail 27 or "T" rail 28 joints 26 of the cross beam/support leg interface 22. Said groove 32 is located along a vertical line 33 at the center of each support leg device 13. The taper increases in width from the bottom 68 to the top 69.

Each support leg device 13 is of unitary construction having two support legs 35 which are integrally joined by a triangular bridge member 34. The top portion 36 of each triangular bridge member 34 is horizontal 36 from a side aspect and forms a plane surface which is at an acute angle 37 complimentary to the acute angle 38 formed between the dovetail or "T" rail joints 26 and the bottom of the channel member 72. This complimentary angle configuration provides a tight fit between the channel member 12 the interface member 22 integral combination and the support leg device 13 when the support leg device 13 is in its fully assembled position. The bottom 39 of each support leg 35 is angled 40 to provide a parallel surface which will squarely meet the floor 41. Referring to FIG. 1, the cross beam 10 may be constructed of standard lumber, such as, but not exclusively a 2×4 board, and is cut to an appropriate length 42 in accordance with the saw horse length.

"TYPE B" DESCRIPTION

Figure 5:
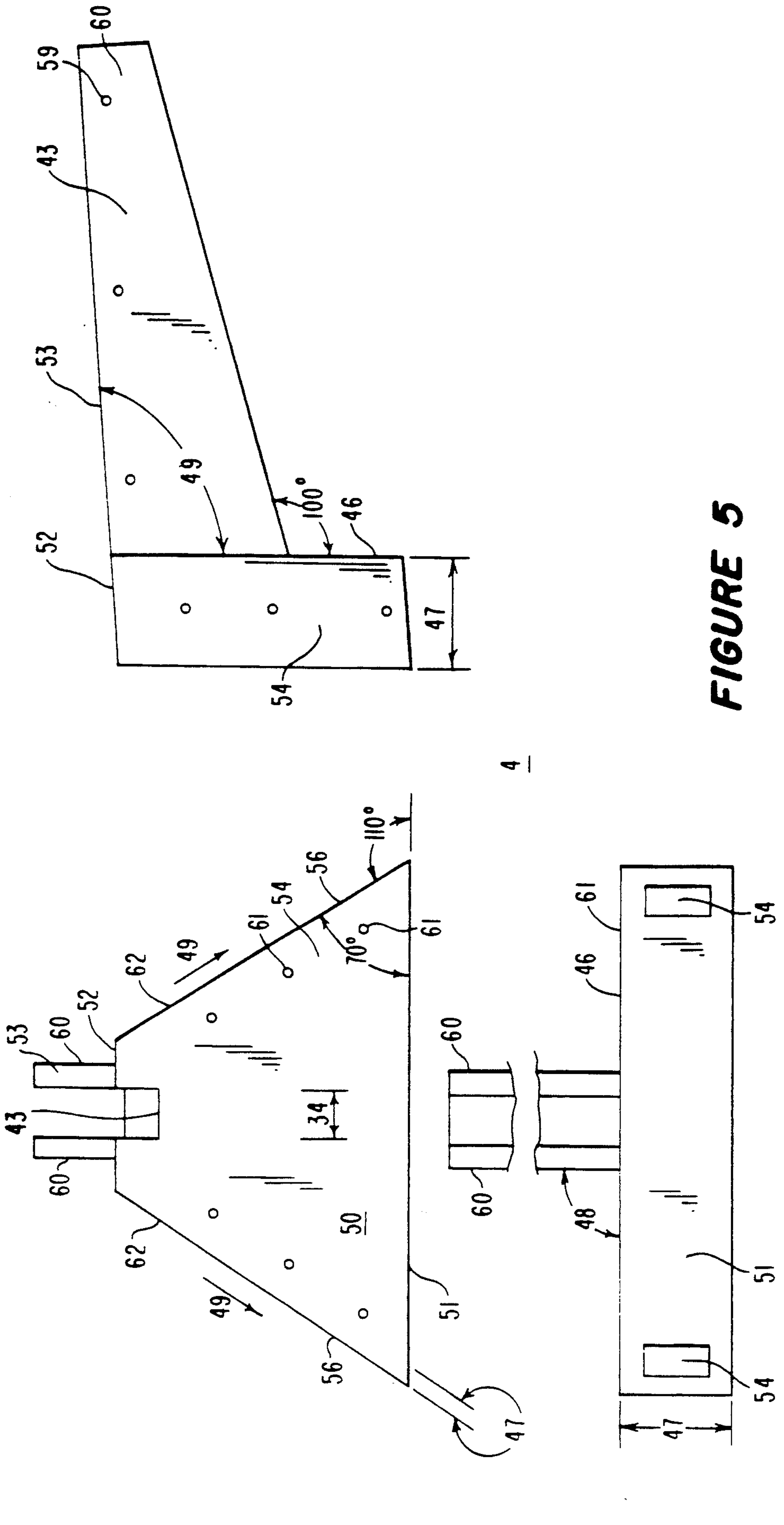
FIG. 5 illustrates front, side and bottom views of a Type "B" cross beam/support leg interface. The bottom view illustrates integrally molded support leg interface sockets used in "Type B" of the preferred embodiment.

Referring now to FIGS. 4 and 5, a Type "B" embodiment comprises two separate cross beam/support leg interfaces 14 which are supported by at least two support leg devices and a plurality of support legs 15. Each cross beam/support leg interface 14 contains a three sided channel 43 that extends longitudinally along the interface and envelopes the bottom of an optional lumber cross beam 16 and the lower portion of each of its sides 17 Each channel 43 extends down the length of the cross beam 10 to a point at or near its midpoint 84, the result being that all or most of the cross beam 10 is supported by the two cross beam/support leg interfaces 14. Each channel 43 has a dimension 44 adequate to accept standard lumber cross beams 10, such as, but not exclusively a 2×4 board.

The channel portion 43 of each cross beam/support leg interface 14 is supported in a cantilever position 45 at its outer length where it meets a plane surface wall 46 with thickness 47 that is perpendicular 48 to the sides of the cross beam from one aspect, but forms an obtuse angle 49 with the horizontal sides of the cross beam 10 from another aspect. The thick wall, 46 and 47, extends downward 49 forming a triangle 50 having a base 51 facing the floor. The top of this triangle 52 is flat where it joins the top 53 of the cross beam/support leg interface 43. The thick wall portion, 46, 47, and 50, and the cross beam/support interface 43 of each interface comprise an integrally molded unit 14.

The thick 47, partially triangular 50 wall portion of each interface member 14 is provided with two rectangular sockets 54 located at the bottom 51 for interface with support legs 15 which will insert 55 into each socket 54. The sockets 54 are located inside the outer two sides 56 of the triangular wall portion 50 so that the legs 15 will extend at the same angle 57 as each side 56 of the triangular wall 50 to form an acute angle 58 relative to each other. The legs 15 are placed at such an angle 58 to provide stability to the saw horse. The sockets 54 have dimensions adequate to accept standard lumber legs 15, such as, but not exclusively a 2×4 board.

The cross beam channel member 43 is provided with spaced holes 59 on each of its sides 60 to provide a means for attaching the channel 43 member to the cross beam 10; for example, by nailing or screwing the channel, 43 and 59, to the cross beam 10. The spaced holes are placed so that insertion of nails or screws on either side will not collide.

The leg sockets 54 are provided with spaced holes 61 on the inside plane surface 46 and on the outer sides, 56 and 62, of the triangular wall 50 to provide a means for attachment to the support legs 15; for example, by nailing or screwing the support legs to the socket walls.

The support legs 15 are constructed of standard lumber, such as 2×4 boards, and are cut to appropriate lengths 63 to provide an adequate saw horse working height 64. Each support leg 15 is angled at its bottom 66 to provide a parallel match with the floor 67. The cross beam 10 is constructed of standard lumber, such as a 2×4 board, and is cut to an appropriate length 65 providing the saw horse length.

While it is apparent that the invention herein disclosed is well calculated to fulfill the objects above stated, it will be appreciated that numerous embodiments and modifications may be devised by those skilled in the art, and it is intended that the appended claims cover all such modifications and the embodiments fall within the true spirit and scope of the present invention.

What is claimed is:

1. A sawhorse apparatus comprising:

at least one unitary, molded cross beam/support leg interface having a three sided, upwardly open channel that extends longitudinally along the top of the interface and having at least one interlocking dovetail or "T" rail joint member extending downwardly along an incline adjacent the bottom of the interface; and a plurality of support leg devices each having opposed inclined faces with a downwardly extending groove in only one of said faces which slidably interfaces with said joint member of said cross beam/support leg interface.

2. Apparatus according to claim 1 wherein said cross beam/support leg interface comprise first and second unitary members and each unitary member further comprises:

a three sided channel which envelopes the bottom of a beam and the lower portion of each of its sides longitudinally to a point at or near the midpoint of said beam; said channel portion of each interface is supported in a cantilever position, at its outer length where it meets a plane surface wall with thickness that is perpendicular to the sides of the cross beam from one aspect, and forms an obtuse angle with the bottom of the cross beam from another aspect, said thick wall extends downward forming a triangle having a base facing the floor and a top being severed by the top flat surface of the channel; and said thick wall is provided with two rectangular sockets protruding into its bottom surface for interface with legs which will insert into each socket, said sockets being located along the outer two sides of the triangular wall, whereby the legs will extend at the same angle as each side of the triangular wall to form an acute angle relative to each other, said legs at such an angle as to provide stability to the saw horse.

3. The apparatus of claim 2 wherein said cross beam/support leg interface is provided with spaced holes on each side to provide a means for attachment to a cross beam; for example, by nailing or screwing the channel through the holes to the cross beam member; and said spaced holes are placed to allow nails or screws to be inserted without colliding.

4. Apparatus according to claim 2 wherein said leg sockets are provided with spaced holes on each side of the socket and on the outer face of the triangular wall to provide a means for attachment to the support legs; for example, by nailing or screwing the socket wall through the holes to the inserted support legs.

5. Apparatus according to claim 2 wherein a cross beam constructed of standard lumber, such as a 2×4 board, and is cut to an appropriate length providing the saw horse length.

6. Apparatus according to claim 2 wherein each unitary interface member is molded using high impact plastic.

7. Apparatus according to claim 1 wherein said cross beam/support leg interface comprises one unitary member further comprising:

a single three sided channel adapted to envelop the bottom of a beam longitudinally and the lower portion of each of its sides, said channel having dimensions adequate to accept a standard lumber cross beam; and having a slope towards the longitudinal center line of the channel containing a space between the beam and the beam support leg interface providing a means for drainage of moisture.

8. Apparatus according to claim 7 wherein opposing sides of the three sided channel enveloping the beam contain means including spaced holes for attachment of the beam/support leg interface of the beam by nailing or screwing; and said spaced holes are placed to allow complete insertion of nail or screws without collision.

9. Apparatus according to claim 7 wherein said support leg devices have a groove which provides a means for interlocking with a tapered dovetail joint or tapered "T" rail joint, said groove traveling down the center of each support leg device.

10. Apparatus according to claim 7 wherein said support leg device being of unitary construction having two legs which are joined by a triangular bridge member, the top portion of each bridge member having a plane surface which is at an acute angle relative to a bottom portion of said channel and providing a fit between the channel member bottom and each support leg device when the support leg devices are in their assembled positions.

11. Apparatus according to claim 7 wherein said cross beam/support leg interface, is molded using high impact plastic.

12. Apparatus according to claim 7 wherein the bottom of the three sided channel is dimensioned to accept the narrower side of standard lumber, such as, but not exclusively the narrower side of a 2×4 board.

13. Apparatus according to claim 7 wherein the bottom of the three sided channel is dimensioned to accept the wider side of standard lumber, such as, but not exclusively the wider side of a 2×4 board.

14. A sawhorse apparatus comprising:

at least one unitary, molded cross beam/support leg interface having a three sided channel that extends longitudinally along the top of the interface and having at least one joint member adjacent the bottom of the interface;

a plurality of support leg devices which interconnect with said cross beam/support leg interface;

said three sided channel being adapted to envelop the bottom of a beam longitudinally and the lower portion of each of its sides, said channel having dimensions adequate to accept a standard lumber cross beam, and said joint member being located at the bottom of the three sided channel, running along its centerline and down most of its length, said joint member having a thickness which is less than the thickness of the channel and a length which is less than that of the channel and which determines the distance between leg support devices, said joint member having ends that are formed of tapered dovetails or tapered "T" rails which secure the support leg devices to the cross beam/support leg interface member.

15. A sawhorse apparatus comprising:

at least one unitary, molded cross beam/support leg interface having a three sided channel that extends longitudinally along the top of the interface and having at least one joint member adjacent the bottom of the interface;

a plurality of support leg devices which interconnect with said cross beam/support leg interface;

said three sided channel being adapted to envelop the bottom of a beam longitudinally and the lower portion of each of its sides, said channel having dimensions adequate to accept a standard lumber cross beam, and said joint member being located at the bottom of the three sided channel, running along its centerline and down most of its length, said joint member having a thickness which is less than the thickness of the channel and a length which is less than that of the channel and which determines the distance between leg support devices, said joint member having ends that are formed of tapered dovetails or tapered "T" rails which secure the support leg devices to the cross beam/support leg interface member;

said interface member dovetail or "T" rail ends are slanted at angles, of approximately ten degrees from vertical, for providing a means for increasing the base of the apparatus by slanting the support leg devices slightly away from center of the cross beam device thereby adding stability.

* * * * *